US010865990B2

(12) United States Patent
Stytsenko et al.

(10) Patent No.: US 10,865,990 B2
(45) Date of Patent: Dec. 15, 2020

(54) NESTED ARTICLE BY ADDITIVE MANUFACTURING WITH NON-REMOVABLE INTERNAL SUPPORTING STRUCTURE

(71) Applicant: ANSALDO ENERGIA SWITZERLAND AG, Baden (CH)

(72) Inventors: Alexey Stytsenko, Moscow (RU); Sergey Mylnikov, Moscow (RU); Igor Baibuzenko, Moscow (RU); Michael Maurer, Bad Säckingen (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 301 days.

(21) Appl. No.: 15/816,314

(22) Filed: Nov. 17, 2017

(65) Prior Publication Data
US 2018/0142894 A1      May 24, 2018

(30) Foreign Application Priority Data

Nov. 18, 2016    (EP) .................................... 16199700

(51) Int. Cl.
*F23R 3/28*   (2006.01)
*F23R 3/36*   (2006.01)
*F02C 7/22*   (2006.01)

(52) U.S. Cl.
CPC .............. *F23R 3/286* (2013.01); *F02C 7/222* (2013.01); *F23R 3/283* (2013.01); *F23R 3/36* (2013.01);

(Continued)

(58) Field of Classification Search
CPC .... F23R 2900/03341; F23R 3/20; F23R 3/36; F23R 3/14; F23R 3/283; F23R 3/286;
(Continued)

(56) References Cited

U.S. PATENT DOCUMENTS

| 7,481,059 B2 * | 1/2009 | Andersson .............. F02C 7/222 60/761 |
| 8,011,188 B2 * | 9/2011 | Woltmann ................ F23R 3/12 60/761 |

(Continued)

FOREIGN PATENT DOCUMENTS

| EP | 0 718 470 A2 | 6/1996 |
| EP | 2 962 790 A1 | 1/2016 |
| EP | 3 076 084 A1 | 10/2016 |

OTHER PUBLICATIONS

European Search Report dated May 10, 2017.

*Primary Examiner* — Scott J Walthour
*Assistant Examiner* — Todd N Jordan
(74) *Attorney, Agent, or Firm* — Buchanan Ingersoll & Rooney PC

(57) ABSTRACT

An additive manufactured article for a gas turbine having a body with two lateral surfaces elongated in a first direction; at least a nested duct housed within the lateral surfaces and elongated in the first direction; a structure so that the nested duct is structurally connected to an attachment within the lateral surfaces, wherein at least the body, the duct and the structure are manufactured by an additive manufacturing process and the structure includes an array of ribs attached to the duct in order to compensate differential elongation along the first direction of the duct with respect to the attachment of the ribs by flexural deformation.

10 Claims, 5 Drawing Sheets

(52) U.S. Cl.
CPC ...... *F05D 2230/31* (2013.01); *F05D 2250/14* (2013.01); *F05D 2250/16* (2013.01); *F23R 2900/00018* (2013.01); *F23R 2900/03341* (2013.01)

(58) Field of Classification Search
CPC .... F23R 2900/00018; F23R 3/16; F23R 3/12; F23D 2204/10; F23C 7/004
See application file for complete search history.

(56) References Cited

U.S. PATENT DOCUMENTS

| | | | | |
|---|---|---|---|---|
| 8,490,398 | B2* | 7/2013 | Poyyapakkam | F23R 3/286 |
| | | | | 431/350 |
| 8,572,980 | B2* | 11/2013 | Winkler | F23R 3/34 |
| | | | | 60/742 |
| 8,677,756 | B2* | 3/2014 | Poyyapakkam | F23C 5/08 |
| | | | | 60/740 |
| 8,938,971 | B2* | 1/2015 | Poyyapakkam | B01F 5/0451 |
| | | | | 60/770 |
| 10,267,522 | B2* | 4/2019 | Ciani | F23R 3/20 |
| 2009/0255265 | A1* | 10/2009 | McMasters | B23P 6/007 |
| | | | | 60/748 |
| 2012/0272659 | A1 | 11/2012 | Syed et al. | |
| 2016/0003157 | A1 | 1/2016 | Ott et al. | |
| 2016/0146468 | A1* | 5/2016 | Gao | F23R 3/16 |
| | | | | 60/742 |
| 2016/0290238 | A1 | 10/2016 | Loeffel et al. | |
| 2017/0138599 | A1* | 5/2017 | Baibuzenko | F23R 3/16 |

\* cited by examiner

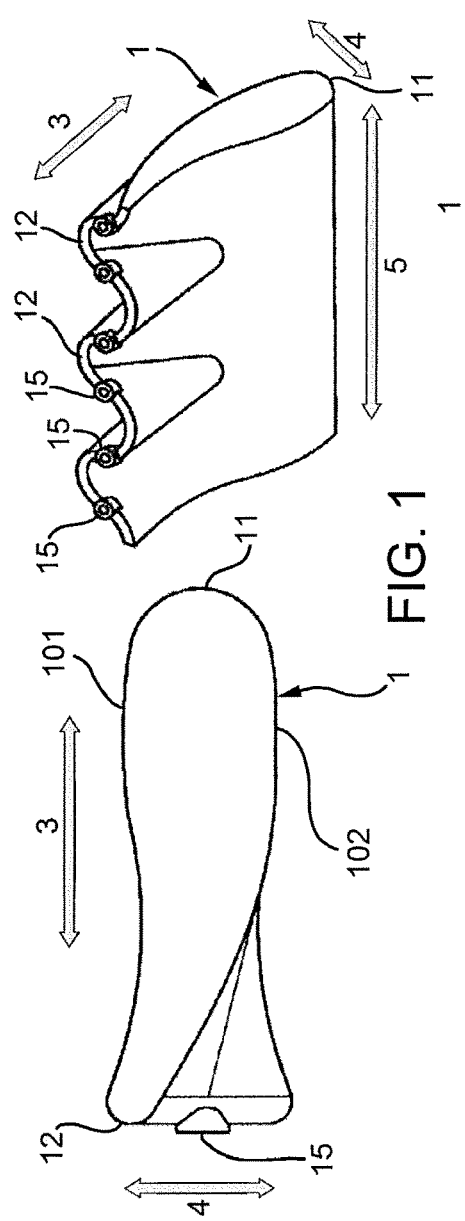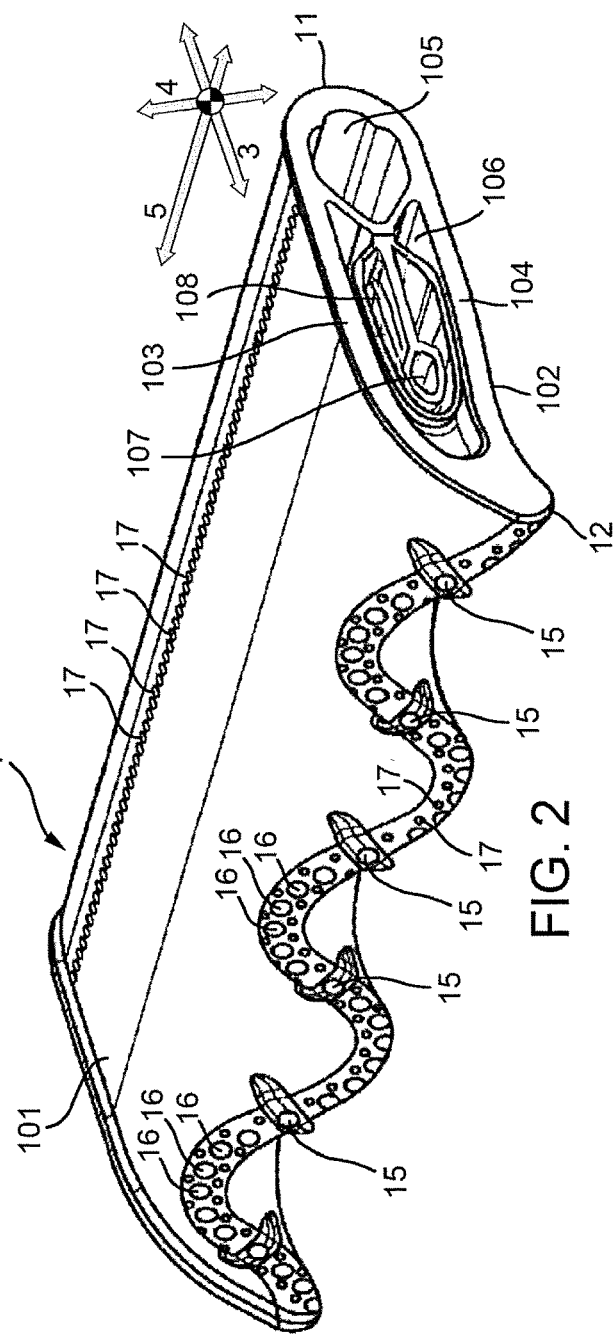

NESTED ARTICLE BY ADDITIVE MANUFACTURING WITH NON-REMOVABLE INTERNAL SUPPORTING STRUCTURE

PRIORITY CLAIM

This application claims priority from European Patent Application No. 16199700.2 filed on Nov. 18, 2016, the disclosure of which is incorporated by reference.

TECHNICAL FIELD

The present invention relates to an article by additive manufacturing for a gas turbine. In a non limiting embodiment, a fuel injector comprises such an article.

The present invention further refers to a gas turbine with such an article.

BACKGROUND

Additive manufacturing methods for producing objects comprise layer-by-layer solidification of a material, such as a metal powder material, using a high energy beam, such as a laser beam or electron beam. A powder layer is deposited on a powder bed in a build chamber and a laser beam is scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required.

Additive manufacturing is capable of shaping complex structures, including concentric or nested bodies. In order to observe strict dimension and/or shape tolerances of concentric or nested bodies, support structures substantially extending along the direction of motion of the powder bed are provided to support e.g. overhanging portions. In particular, during manufacturing, support structures provide support by solidified layers and not by unmolten material, e.g. by unmolten powder material of the powder bed.

After completion of the solidification of each layer, support structure should be removed in order to avoid a harmful impact during functioning of the final product. However, sometimes this is not possible because of the complex shape of the product, i.e. because there are nested and elongated parts. For example, additive manufacturing is used to manufacture an article for a gas turbine, the article having portions exposed in use to differential thermal expansion, e.g. due to a hot gas plenum surrounding a nested duct for a liquid at environment temperature, wherein the duct is attached to a support structure. This is for example the case in a fuel injector finger of a combustor for a gas turbine.

In combustors, in order to achieve acceptable exhaust gas pollutant levels, thorough mixing of fuel with the oxidant, such as, most commonly used, air, is required before the fuel is burnt. In gas turbines with so-called sequential combustion, such as e.g. described in EP 0 718 470 B1, subsequent combustors are provided with partly expanded, still oxygen-rich, flue gas from a preceding turbine, serving as the oxidant. In such gas turbines, and there in particular in the subsequent combustors, the oxidant entering the combustor, that is, partly expanded flue gas, has a temperature in excess of a fuel self-ignition temperature. That is, the fuel will, after a certain ignition delay time, ignite spontaneously. It is thus crucial to achieve a complete and uniform fuel/oxidant mixing within a limited time frame before the fuel ignites.

US 2012/0272659 A1 for instance discloses a fuel injector device having a generally airfoil-like shape, with a trailing edge having an undulating shape across the flow direction, wherein said undulating aerodynamic cross section develops in a streamwise direction from the leading edge to the trailing edge. At the trailing edge, flows having opposite velocity components across the main flow direction meet and intermingle, and develop vortices propagating downstream from the trailing edge, said vortices having a center of rotation essentially at inflection points of the undulating trailing edge. Fuel is injected through fuel injection means arranged at the trailing edge essentially at said inflection points, and, due to the vortices, is intensively admixed with the oxidant.

The internal geometry of this device is, however, highly complex. Multiple plenums for cooling air, carrier air and at least one fuel need to be provided inside the device. Also, means for guiding and discharging the various fluids need to be provided. Thus, such devices are manufactured by additive manufacturing.

SUMMARY

It is an object of the present invention to provide an article by additive manufacturing having nested and elongated parts and a support structure for the nested parts, to optimize the design of the support part so that the latter can be maintained during use of the article and/or that a non-removed support part has a negligible impact during working life of the article.

The basic idea of the present invention is to shape the support structure of a nested portion in an additive manufactured article as an array of ribs. Such ribs, in case of differential thermal expansion at the ends of the ribs during use of the article, will elastically flex in order to follow the differential expansion and avoid excessive constraining. This leads to decrease of internal stress during functioning and of manufacturing time and costs because there is no need to remove the supporting structure anymore before the article is assembled in the gas turbine.

It is a further object of the invention to provide a gas turbine with such an article that, in use, is exposed to differential thermal expansion.

These and other objects are obtained by an article according to claim 1, a fuel injector device according to claim 8 and a gas turbine according to claim 12.

BRIEF DESCRIPTION OF THE DRAWINGS

For a better understanding of the present invention, the latter will further be disclosed with reference to the accompanying figures in which is shown:

FIG. 1: a fuel injector device according to the present disclosure in a side view and a perspective view;

FIG. 2: a more detailed view of an exemplary embodiment of a fuel injector device in a perspective view;

FIG. 5b: an enlarged details of an alternative embodiment of the detail in FIG. 5a;

DETAILED DESCRIPTION OF EXEMPLARY EMBODIMENTS

Figure 3:
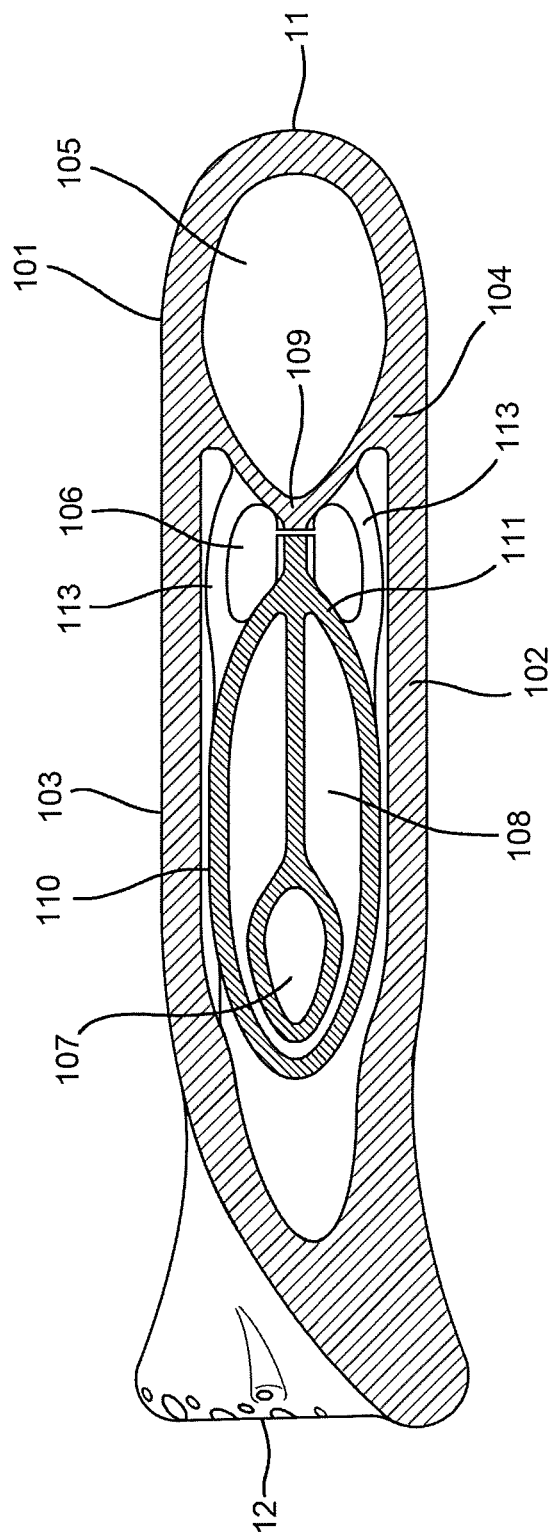
FIG. 3: a side view of the device of FIG. 2.

A general view of an exemplary embodiment of an article, e.g. a fuel injector device, according to the present disclosure is shown in FIG. 1. The left part of the figure shows a side view, while the right part of the figure shows a perspective view. As is seen in the side view, the fuel injector device 1 comprises a body, having, in a longitudinal section, an aerodynamic shape, generally resembling an airfoil. The fuel injector device comprises a leading edge 11 and a trailing edge 12, and has a streamwise direction between the leading edge and the trailing edge, depicted at 3. The fuel injector device body further comprises a first surface 101 and a second surface 102 opposite the first surface, each of said surfaces extending between and comprising the leading edge and the trailing edge, and said surfaces conjoining each other at the leading edge and the trailing edge. The surfaces 101 and 102 extend along the streamwise direction 3 and along a crosswise direction 5, depicted in the right part of FIG. 1. The fuel injector device is bar-shaped. A transverse direction 4 extends between the two surfaces 101 and 102 and is in particular perpendicular to the streamwise direction 3 and the crosswise direction 5. As can be seen, the profile of the airfoil-shaped longitudinal section changes from one longitudinal section to a neighbouring longitudinal section across the fuel injector device body, resulting in a trailing edge 12 undulating when seen along the streamwise direction, or, across a main flow direction. A number of fuel discharge means 15 are provided on the trailing edge 12.

Streamwise or streamwise direction, in the context of this document, shall mean the non-directional orientation between the leading edge and the trailing edge. Upstream, in the context of this document, is understood as a directional streamwise orientation from the trailing edge to the leading edge against the direction of flow.

Downstream, in the context of this document, is understood as a directional streamwise orientation from the leading edge to the trailing edge in the direction of flow.

Generally, in the further course of the present disclosure, the term "inclined" or "inclined surface" will be used for an element or a surface which forms an angle with the streamwise direction which is smaller than or equal to a maximum angle of 60°. In specific embodiments, the maximum angle is 45°.

FIG. 2 shows a fuel injector device according to the present disclosure in a perspective view in more detail. Fuel injector device 1, as mentioned above, comprises leading edge 11, trailing edge 12, and surfaces 101 and 102 extending between and comprising the leading and the trailing edge. A number of fuel discharge means 15, as already mentioned in connection with FIG. 1, are arranged on the trailing edge. Furthermore, a number of fuel discharge means 16 is provided on the trailing edge. Moreover, cooling air outlet means 17 are provided on the surfaces 101 and 102, respectively, and on the trailing edge. The first surface 101 is provided on a first wall 103 of the fuel injector device body, whereas the second surface 102 is provided on a second wall 104 of the fuel injector device body, said walls enclosing an internal space. Just like the surfaces 101 and 102, the walls 103 and 104 extend between and comprise the leading edge and the trailing edge, and conjoin at the leading edge and the trailing edge. Inside the internal space, a cooling air plenum 105, a carrier air plenum 106, a fuel duct 107 and a fuel plenum 108 are provided. Cooling air supplied to cooling air plenum 105 is led through near wall cooling channels (not visible in this depiction) in order to cool the walls 103 and 104, and is discharged through the cooling air outlet means 17. Fuel is supplied to duct 107 and the fuel plenum and is discharged through fuel discharge means 15 and 16. Carrier air supplied to the carrier air plenum 106 is discharged through the carrier air openings arranged at the fuel discharge means. To that extent, a number of ducts for guiding the fluids to the respective discharge openings need to be provided inside the fuel injector device.

FIG. 3 shows a more detailed side view of the fuel injector device 1. The fuel injector device 1 comprises a first wall 103 on which the surface 101 is provided, and a second wall 104 on which the surface 102 is provided. The walls extend between and comprise the leading edge 11 and the trailing edge 12, and the walls conjoin each other at the leading edge and the trailing edge. An internal space is enclosed by the walls. This internal space comprises a cooling air plenum 105, the fuel duct 107, the fuel plenum 108, and a carrier air plenum 106. The fuel plenums 107 and 108 are enclosed by a fuel plenum shell 110. The shell is supported within the internal space by struts 113. From the first fuel duct 107, in this exemplary embodiment a fuel oil plenum, a fuel oil nozzle 114 (shown in FIG. 4) leads to fuel discharge means 15. The fuel plenum 108 is in this embodiment intended as a fuel gas plenum, and fuel gas conduits 115 connect the fuel gas plenum to fuel gas discharge means 16. The shell 110 has no contact with inner surfaces of the walls 103 and 104 and a gap is formed between the shell 110 and the walls 103 and 104, and thus carrier air is able to flow around the shell to the fuel discharge means 15 and 16, and can, in a manner known in the art, be discharged as carrier air at the fuel discharge means. The cooling air plenum 105 is on its downstream end delimited by internal wall structure 109. The carrier air plenum 106 is on its upstream end delimited by internal wall structure 109, and is on its downstream end delimited by internal wall structure 111, which at the same time is a part of the shell 110. The fuel duct 107 has an upstream portion connected to the internal wall structure 111 by an array of ribs 200. Preferably, ribs 200 are thicker close to the attachments, e.g. to fuel duct 107 and wall structure 111 of gas shell 110. This helps to provide preferred breaking areas, i.e. the thinner parts, away from fuel duct 107 and wall structure 111. Even more preferably, thickened portions of ribs 200 have parabolic or elliptic fillets for attaching to fuel duct 107 and wall structure 111 in order to favour the additive manufacturing steps of melting layer by layer the compound of which the injector is made.

Figure 5B:
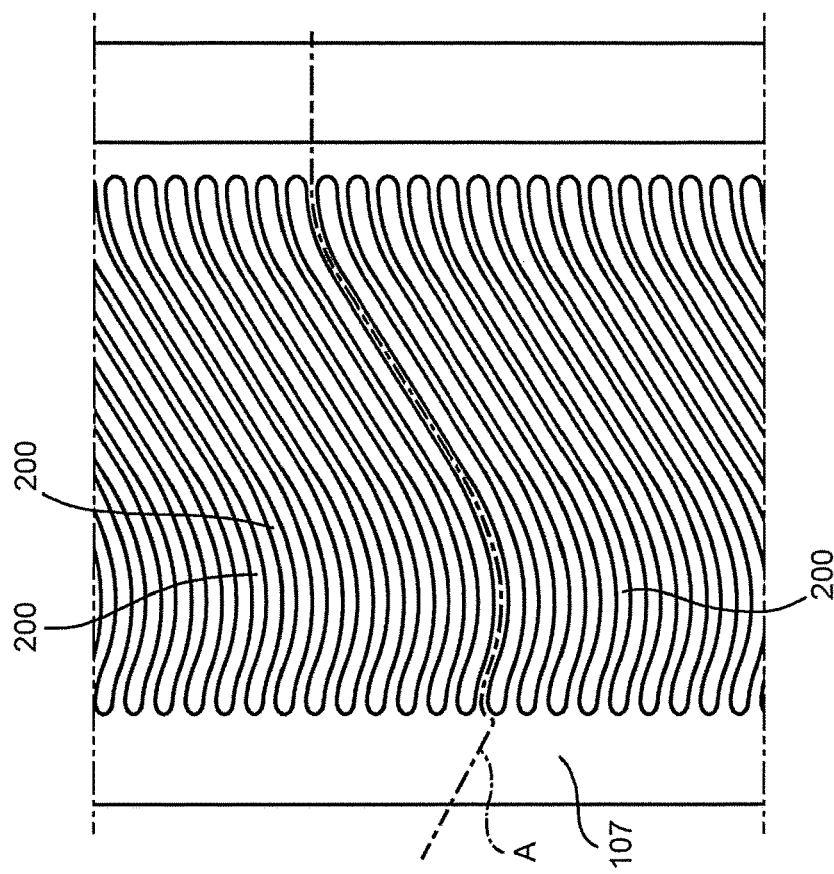
Figure 5A:
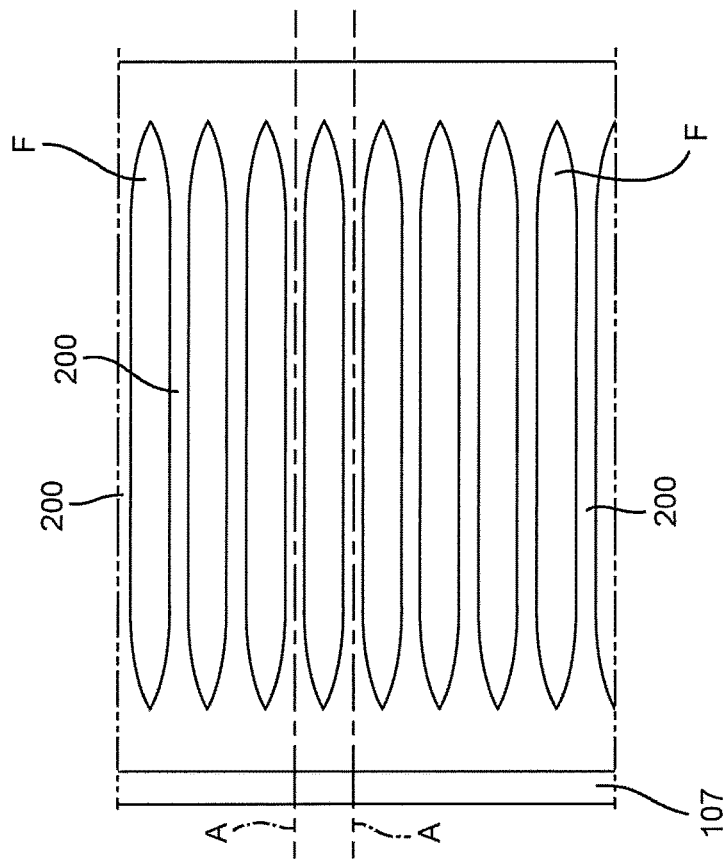
FIG. 5a: an enlarged detail of FIG. 2.

On its downstream end, the fuel plenum 108 is connected to fuel oil nozzles 114. The fuel plenum 108 is on its upstream end delimited by internal wall structure 111, and is on its downstream end delimited by a downstream part of the shell. Ribs 200 may substantially be perpendicular to transverse direction 4 e aligned to the streamwise direction 3. However, ribs may follow other paths, i.e. ribs may be arched or wavy as shown in FIG. 5b or other similar shapes, in particular planar shapes. Struts 113 are preferably inclined with respect to the transverse direction 4, such as to form an apex and two legs, with the apex pointing upstream or downstream along the streamwise direction 3. In other words, the wall structures are inclined with respect to the streamwise direction at an angle of less than 90°. The apexes of wall structures 109 and 111 meet. Thus, they mutually support each other during manufacturing by an additive manufacturing process, such as for instance selective laser melting, along the streamwise direction.

Figure 6:
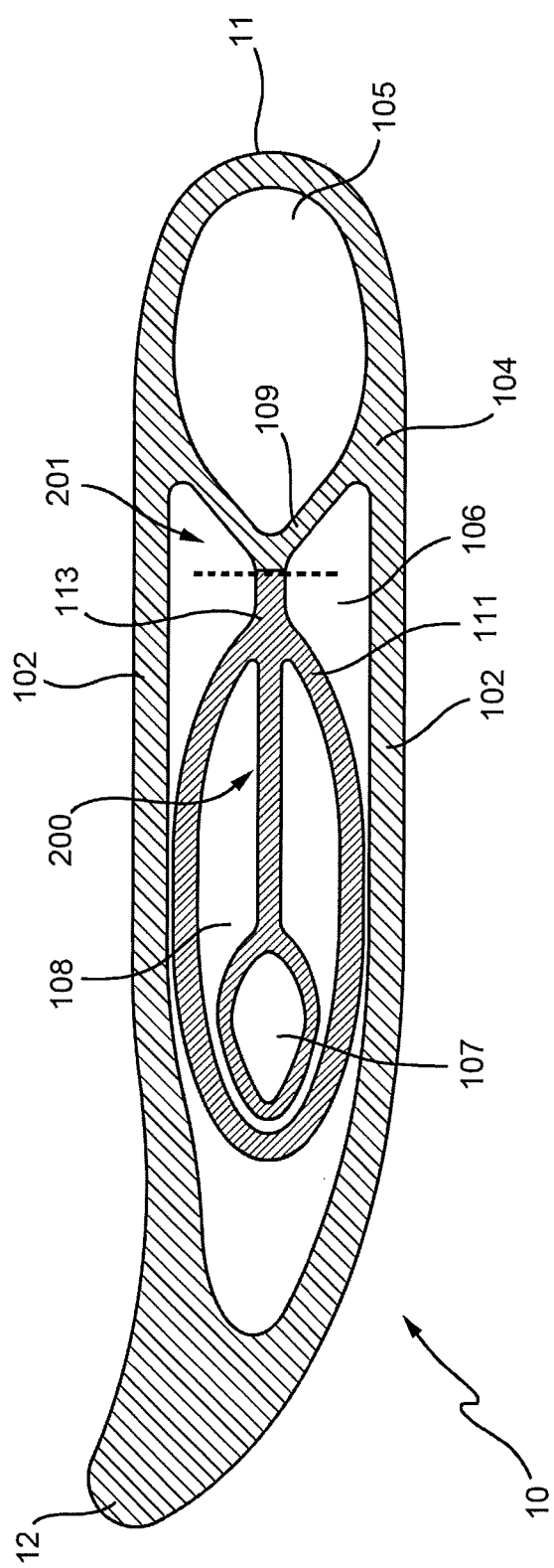
FIG. 6: a side view of the device according to a further embodiment of the present invention.

The alternative embodiment shown in FIG. 6 is similar to that described in relation to FIG. 3, except for what follows.

Struts 113 are not inclined with respect to transverse direction 4 and are substantially parallel to the latter. In order to avoid excessive tension in the strut 113 region, there is a cut 201 between the wall structure 109 and the struts 113. Cut 201 is substantially parallel to the crosswise direction 5 and is operated during manufacturing e.g. by Electric Discharge Machining (EDM) as a finishing after the additive manufacturing process. As an alternative, cut 201 may be the result of a self-breakable support intended to break and detach wall structure 109 from struts 113 under predefined working conditions, e.g. during first engine start.

Figure 4:
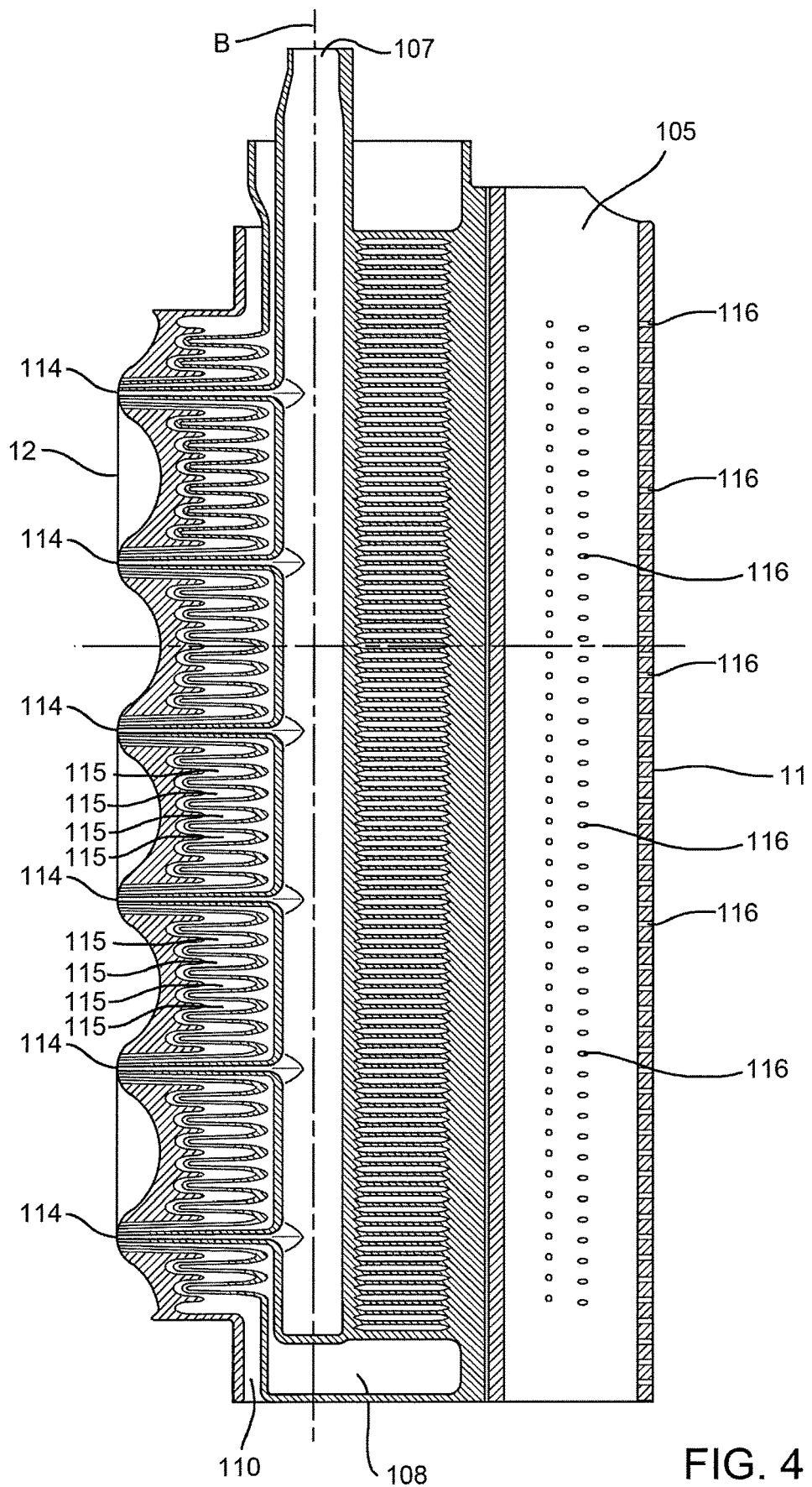
FIG. 4: a first cut through the device of FIG. 2.

FIG. 4 depicts a cross section along a plane parallel to directions 3 and 5 of FIG. 2, and lines out the internal structure in more detail. A multitude of fuel oil nozzles 114 extend from the fuel duct 107 to the first fuel discharge means 15. Fuel conduits 115 extend from the fuel plenum 108 to the fuel discharge means, which are not visible in this depiction. Cooling air channels 116 branch off cooling air plenum 105.

Greater detail about connection of conduits 114, 115, 116 with nozzles 114, discharge means 16 and outlet means 17 can be found in copending application EP-A1-3076084.

In order to provide an embodiment of the present invention, injector device 1 comprises duct 107 nested inside shell 110. Both duct 107 and shell 110 extend along one direction, e.g. the crosswise direction 5, and experience differential thermal expansion because, e.g. during steady state functioning of the gas turbine, duct 107 and shell 110 are filled with fuel at a temperature close to environment temperature whilst carrier air plenum 106 and cooling air plenum 105 are filled with high-pressure compressed air at a temperature that may exceed 800°. In such a condition, the walls of shell 110 tend to expand much more than the walls of fuel duct 107 along the direction of elongation of duct 107, e.g. along the crosswise direction. Array of ribs 200 is inclined or perpendicular with respect to the direction of elongation of duct 107 and shell 110. Preferably, ribs 200 are elongated along the build-up direction of the additive manufacturing process, i.e. streamwise direction 3 in the embodiment of the figures. In particular, ribs 200 have respective axes A parallel to streamline direction 3. Furthermore the axes A are comprised in a plane that lies on an axis B of duct 107.

The advantages of the article according to the invention are:

Ribs 200 are substantially monodimensional in order to bend or flex in case of thermal differential expansion between duct 107 at one end of the ribs and the attachment provided by shell 110, which is connected at the other end of the ribs. During manufacturing, ribs 200 ensure strict shape tolerances of duct 107 and during functioning, the flexural capabilities of ribs 200 ensure a negligible impact on the article in case of thermal differential expansion. Therefore, according to the invention, it is possible to convert a potentially harmful element, i.e. a bulk support structure that needs to be removed, into a structural feature that has limited, if any, impact during use and, therefore, shall not be removed. In the embodiment of the figures, a difficult removal of a bulk support structure is due to the combination of elongation of duct 107 within surfaces 102, 103 and nested structure of duct 107 inside shell 110 and within surfaces 102, 103.

In order to obtain the above mentioned effect, it is preferable that an aspect ratio along axis A of the ribs shall be at least 30 or more, preferably comprised between 45 and 65. Indeed, this ensures proper bending or flexural properties over the working life of the article, which is used onboard of a gas turbine. Aspect ratio is defined by the length of a rib 200 along axis A and the relative minimum transversal dimension measured perpendicularly to axis A.

Duct 107 comprises inclined walls and ribs 200 are filleted and/or inclined so that, producing the article by means of additive manufacturing methods, such as for instance selective laser melting or selective electron beam melting, where layer by layer a metal powder is selectively molten and re-solidified, is largely facilitated. This is achieved in that the production of large-scale overhang structures which extend across a buildup direction, e.g. streamwise direction 5 in the embodiment of the figures, is avoided. If, for instance, an overhang structure is to be manufactured by selective laser melting, or other additive manufacturing methods, in one layer, the overhang structure, if no support for the new layer of solidified material is provided, may bend. As a result, a weak product quality may be found, or the manufacturing process might be cancelled. If said overhang structures are appropriately inclined, as is possible during manufacturing of the disclosed device, for each layer only a small overhang will be produced with a short cantilevering length. Thus, each small overhang will be sufficiently supported by previously solidified material.

The article as disclosed is thus particularly well suited for being manufactured by an additive manufacturing process, with the buildup direction directed either from the trailing edge to the leading edge or vice versa in case of the fuel burner of the figures. Furthermore, large scale overhangs extending at a large angle, in particular perpendicular to, the buildup direction are avoided.

It is understood that the features and embodiments disclosed above may be combined with each other. It will further be appreciated that further embodiments are conceivable within the scope of the present disclosure and the claimed subject matter which are obvious and apparent to the skilled person.

For example, the surfaces may define an elongated cylindrical surface, i.e. a tube or pipe, enclosing nested elongated shells and/or ducts.

Furthermore, surfaces 102, 103, depending on the use, may be joined only at one side whilst being free standing at the other edge, e.g. a general 'C' cross section shape. This layout provides, when the article is also elongated, a difficult removal of internal support structure.

The invention claimed is:

1. A fuel injector device for a gas turbine, the fuel injector device comprising:
   a body having two lateral surfaces extending along a longitudinal direction and a crosswise direction; the body being streamlined for use in a fluid flow and the lateral surfaces joined to one another at an upstream side form a leading edge of the body and the lateral surfaces joined to one another at a downstream side to form a trailing edge of the body;
   a shell defining a gas fuel plenum, the shell nested within the lateral surfaces, wherein the shell is configured to provide a gas fuel flow into the fluid flow;
   an oil fuel duct, the oil fuel duct elongated in the longitudinal direction, the oil fuel duct nested within the shell, wherein the oil fuel duct is configured to provide an oil fuel flow into the fluid flow;
   an array of ribs extending between the shell and the oil fuel duct, wherein the array of ribs are configured to compensate differential elongation of the nested oil fuel duct with respect to the shell along the crosswise direction by flexural deformation;
   struts supported within the lateral surfaces for supporting the shell; and a cut defined between the struts and a wall structure, the wall structure delimiting a cooling air plenum, wherein the body, the shell and the oil fuel duct are additively manufactured.

2. The fuel injector device according to claim 1, wherein each rib of the array of ribs is thicker close to the oil fuel duct and the shell.

3. The fuel injector device according to claim 2, wherein each rib of the array of ribs is filleted to the oil fuel duct and/or the shell along a parabolic or elliptic profile.

4. The fuel injector device according to claim 1, wherein an aspect ratio of the each rib of the array of ribs is at least 30.

5. The fuel injector device according to claim 1, comprising:

a cooling air plenum within the lateral surfaces and upstream of the oil fuel duct and the shell, the cooling air plenum being defined by a wall structure.

6. The fuel injector device according to claim 5, comprising:

a carrier air plenum defined within the lateral surfaces by the shell and the wall structure.

7. A gas turbine engine comprising:

a combustor; and the fuel injector device according to claim 1.

8. The fuel injector device according to claim 1, wherein the struts are substantially parallel with respect to a transverse direction of the fuel injector device.

9. The fuel injector device according to claim 1, wherein each rib of the array of ribs is wavy.

10. The fuel injector device according to claim 1, wherein the struts are inclined with respect to a transverse direction of the fuel injector device.

* * * * *